United States Patent
Balluff

[15] 3,658,042
[45] Apr. 25, 1972

[54] GASOLINE EVAPORATIVE EMISSION CONTROL

[72] Inventor: Robert N. Balluff, Rives Junction, Mich.
[73] Assignee: Tenneco Inc., Houston, Tex.
[22] Filed: Feb. 10, 1969
[21] Appl. No.: 797,942

[52] U.S. Cl. ................................123/136, 123/121, 60/30
[51] Int. Cl. ...............................................F02b 75/10
[58] Field of Search ....................123/120, 121, 136; 60/30

[56] References Cited

UNITED STATES PATENTS

| | | | |
|---|---|---|---|
| 1,828,085 | 10/1931 | Syrovy et al. | 60/30 |
| 3,059,420 | 10/1962 | Schnabel | 60/30 |
| 3,177,650 | 4/1965 | Caruso | 60/30 |
| 3,263,412 | 8/1966 | Thompson | 60/30 |
| 3,306,033 | 2/1967 | Carnelius | 60/30 |
| 3,448,731 | 6/1969 | Paigh | 123/136 |
| 3,517,654 | 6/1970 | Sarto et al. | 123/136 |

Primary Examiner—Laurence M. Goodridge
Attorney—Harness, Dickey & Pierce

[57] ABSTRACT

A catalytic converter is used in a hot portion of an internal combustion engine exhaust system to receive and burn unburned fuel vapors from the fuel tank or carburetor.

8 Claims, 2 Drawing Figures

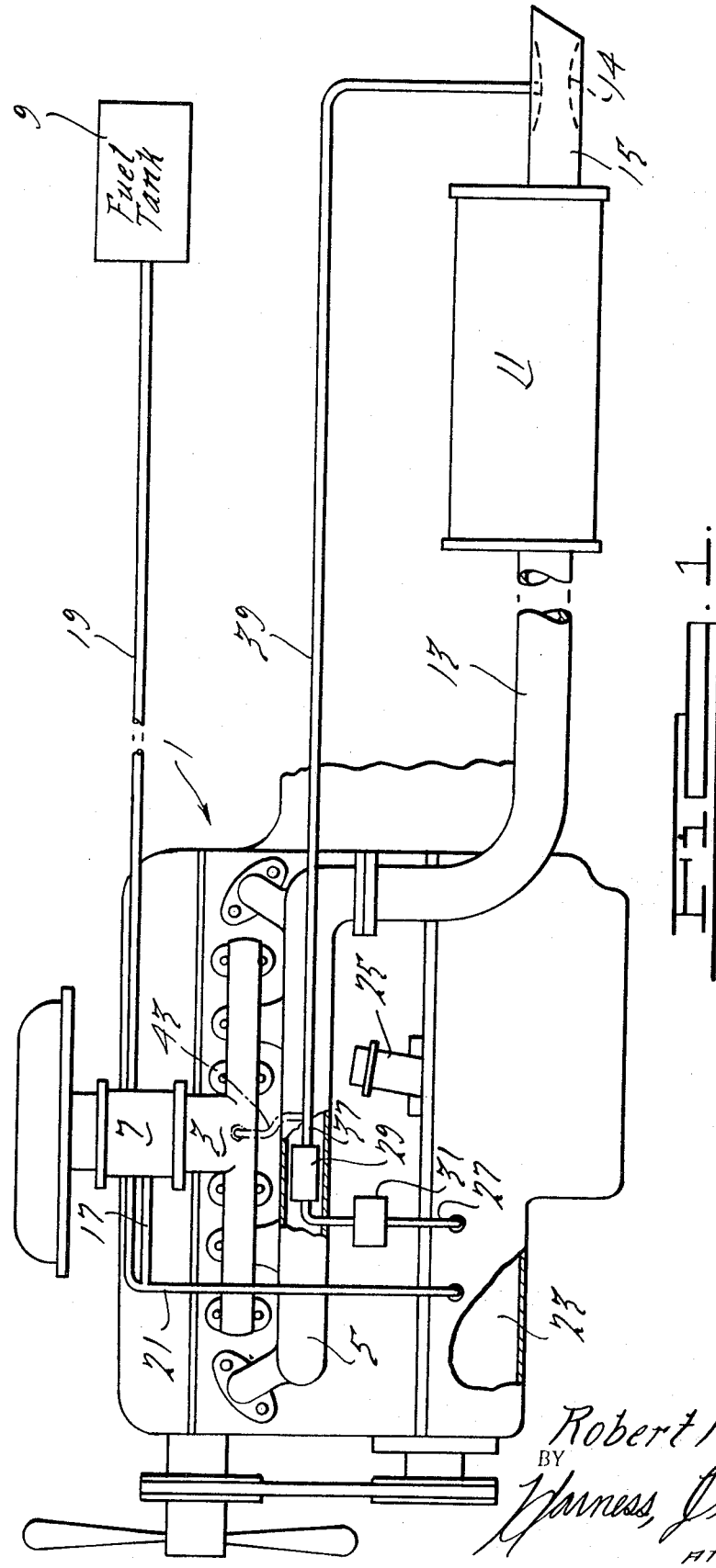

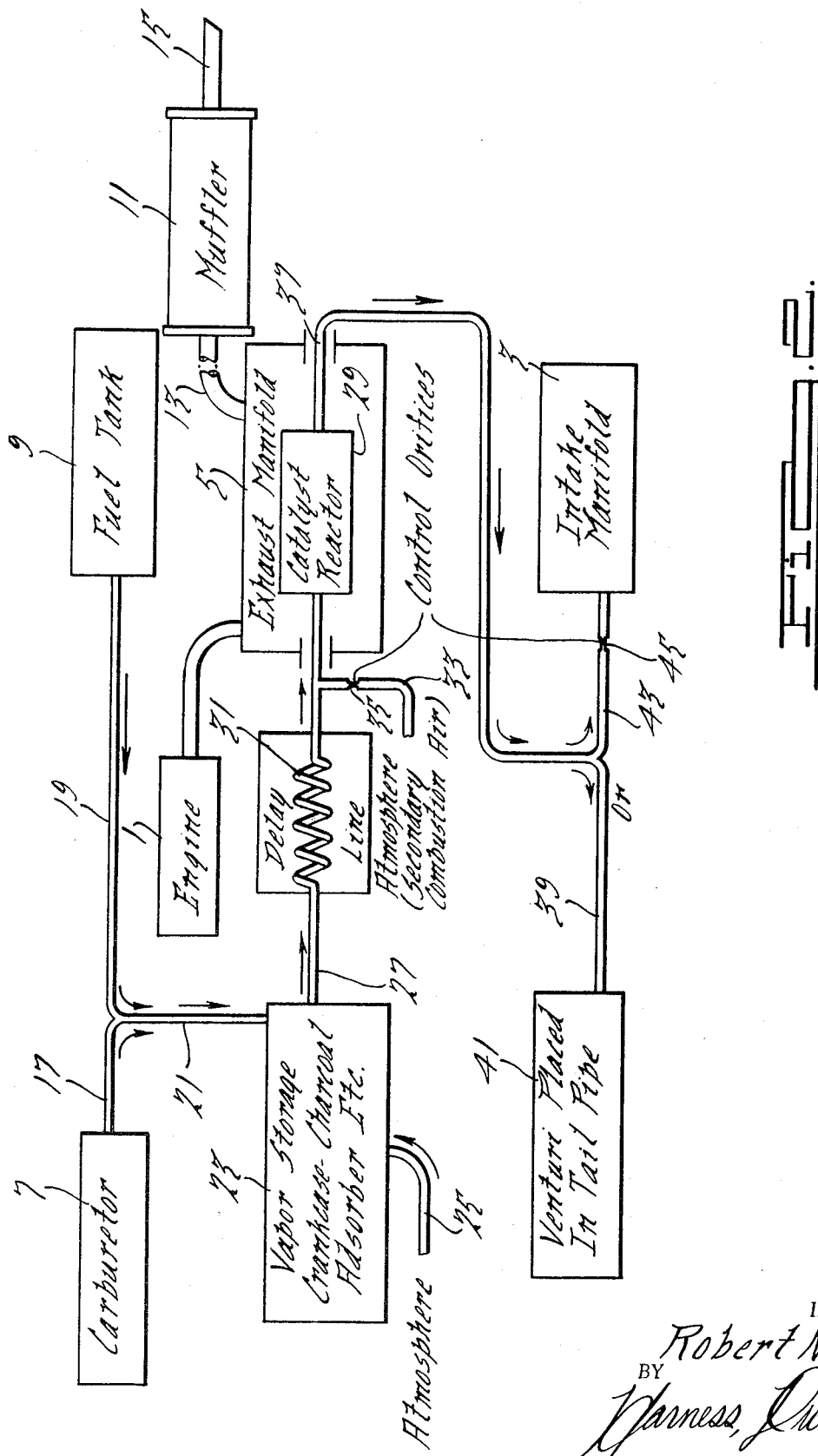

GASOLINE EVAPORATIVE EMISSION CONTROL

BACKGROUND OF THE INVENTION

Raw fuel vapors from the fuel tank or carburetor constitute unburned hydro-carbons which contribute to air pollution in the event they are permitted to escape to atmosphere. In order to avoid this, means have been devised to store or adsorb the fuel vapors and thus prevent their escape in the unburned condition. However, the storage means can become saturated and ineffective whereupon the raw vapors then escape from the engine. While it has been proposed to purge the storage device into the intake manifold, this may upset the engine air fuel ratio which in turn may increase the total exhaust emissions of the engine above acceptable limitations.

BRIEF SUMMARY OF THE INVENTION

The purpose of this invention is to provide a means to prevent saturation of fuel vapor storage systems used with internal combustion engines. The invention accomplishes this by means of a small catalytic converter or reactor which is placed in the exhaust system close enough to the engine so that heat is available to rapidly raise the catalyst to efficient operating temperature. The fuel vapors from the storage system are caused to flow through the catalyst reactor where they are converted or oxidized prior to passage through the engine or directly to the exhaust system.

DESCRIPTION OF THE INVENTION

FIG. 1 is a partially schematic side elevation of an internal combustion engine embodying the invention; and FIG. 2 is a block diagram illustrating the invention.

DETAILED DESCRIPTION OF THE INVENTION

The internal combustion engine 1 has an intake manifold 3 and an exhaust manifold 5 as well as a carburetor 7 which supplies an air fuel mixture to the intake manifold 3 and a fuel tank 9 which supplies gasoline or its equivalent to the carburetor 7. The engine further includes a muffler 11 which is connected by an exhaust pipe 13 to the exhaust manifold and discharges into a tailpipe 15.

Gaseous fuel vapors tend to form in the carburetor 7, particularly when the engine is hot and not running, and in the fuel tank 9, and these are fed by conduits 17 and 19 to a joint conduit 21 and to a vapor storage or accumulator unit 23. This may be the crankcase of the engine or a charcoal adsorber or other appropriate device, being shown as a crankcase with an atmosphere air inlet or conduit 25 that may include a check valve to prevent outflow. In the past, the device 23 may have been allowed to become saturated with vapor and thus ineffective or it may have been purged by connection to the intake manifold 3, resulting in a probable unbalancing of the air fuel ratio.

In accordance with the present invention, the device 23 is connected by means of a conduit 27 to a catalyst reactor 29 which is housed in a suitable part of the engine exhaust system, preferably the exhaust manifold 5, as illustrated. The catalytic converter may be of a known structure and contain a suitable catalyst material known to those in the field of exhaust gas emission control though its size is reduced from exhaust gas catalyst units in proportion to the lesser flow rate. The heat of the exhaust gases in the exhaust manifold 5 will rapidly bring the catalyst material in the reactor 29 to its most efficient operating temperature. The flow of exhaust gases by the unit 29 will also serve to convey away heat and prevent overheating of the unit. A delay device, which may be a coil section 31 in the line 27, is used to give the catalyst unit 29 sufficient time to heat up before fuel vapors from the storage unit 23 reach it when the engine is started. Secondary combustion air from atmosphere is fed into the conduit 29 by a conduit or opening 33 which may include an orifice 35 for the purpose of limiting the maximum quantity of secondary air admitted.

Flow through the catalytic converter 29 is induced in its outlet conduit 37 by its connection to a point in the intake or exhaust system that is at less than atmospheric pressure. The preferred arrangement is to connect the line 37 by means of conduit 39 to the throat of a venturi 41 which is located in the tailpipe 15, thus permitting discharge of the treated or burned fuel vapors directly to atmosphere via the tailpipe. As an alternative and less preferable arrangement, the outlet conduit for the catalyst reactor 29 may be connected by means of a conduit 43 to the intake manifold 3, maximum flow through the conduit 43 being under the control of an orifice 45. The alternative arrangement may be useful when the capacity of the converter 29 appears to be insufficient to burn all escaping fuel hydro-carbons. Because they are even in this instance burned to a considerable degree the remaining unburned fumes that are passed into the intake manifold 3 will not have an effect as harmful to the air fuel ratio as passing the fumes directly from the device 23 into the manifold 3.

Modifications may be made without departing from the spirit of the invention.

What is claimed is:

1. In an internal combustion engine having a carburetor, intake manifold, exhaust system including an exhaust manifold, and fuel tank, the combination of a fuel vapor accumulator connected to the carburetor and fuel tank to receive and store fuel vapors, a housing containing a catalyst reactor adapted at its operating temperature to promote combustion of unburned constituents in the fuel vapors, inlet conduit means connecting the accumulator to the housing for the passage of fuel vapors from the accumulator through the housing, said housing being supported in said exhaust system in external heat transfer relationship with flowing exhaust gases from the engine so that exhaust gases heat the housing but do not contact the reactor inside the housing, and outlet conduit means for said housing for discharging fuel vapors after passage thereof through the reactor.

2. The invention as set forth in claim 1 wherein said engine when operating has a point of sub-atmospheric pressure and said outlet conduit means is connected to said point.

3. The invention as set forth in claim 1 wherein said point of sub-atmospheric pressure comprises the intake manifold and said outlet conduit means is connected to and discharges vapors into said intake manifold.

4. The invention as set forth in claim 3 including a flow control orifice means in the connection between the intake manifold and accumulator.

5. The invention as set forth in claim 1 wherein said exhaust system includes a venturi through which exhaust gases flow to create a point of sub-atmospheric pressure, said outlet conduit means being connected to said point and discharging vapors into the exhaust system.

6. The invention as set forth in claim 1 wherein said inlet conduit means includes a device for delaying flow of fuel vapors to the accumulator upon starting of the engine so that exhaust gases reach the housing prior to the fuel vapors.

7. The invention as set forth in claim 6 wherein said device comprises a flow coil forming a part of said inlet conduit means.

8. The invention as set forth in claim 1 wherein said engine when operating has a point of sub-atmospheric pressure and said outlet conduit means is connected to said point, said inlet conduit means including a device for delaying flow of fuel vapors from the accumulator upon starting of the engine so that exhaust gases reach the housing prior to the vapors, and means for admitting secondary air to the fuel vapors prior to passage through the catalyst reactor.

* * * * *

UNITED STATES PATENT OFFICE
CERTIFICATE OF CORRECTION

Patent No. 3,658,042         Dated   4-25-72

Inventor(s)   Robert N. Balluff

It is certified that error appears in the above-identified patent and that said Letters Patent are hereby corrected as shown below:

Claim 3, line 1, "claim 1" should be -- claim 2 --.

Signed and sealed this 29th day of August 1972.

(SEAL)
Attest:

EDWARD M. FLETCHER, JR.               ROBERT GOTTSCHALK
Attesting Officer                     Commissioner of Patents